(12) United States Patent
Ochiai (10) Patent No.: US 10,993,425 B2
(45) Date of Patent: May 4, 2021

(54) ROTOR DRIVE UNIT WATERPROOF STRUCTURE AND SPINNING REEL

(71) Applicant: Shimano Inc., Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 272 days.

(21) Appl. No.: 15/619,085

(22) Filed: Jun. 9, 2017

(65) Prior Publication Data
US 2018/0055026 A1 Mar. 1, 2018

(30) Foreign Application Priority Data
Sep. 1, 2016 (JP) .............................. JP2016-171163

(51) Int. Cl.
*A01K 89/01* (2006.01)
*A01K 89/033* (2006.01)

(52) U.S. Cl.
CPC .. *A01K 89/011221* (2015.05); *A01K 89/0108* (2013.01); *A01K 89/05* (2015.05)

(58) Field of Classification Search
CPC ............ A01K 89/011221; A01K 89/05; A01K 89/0108
See application file for complete search history.

(56) References Cited

U.S. PATENT DOCUMENTS

| 5,318,247 A * | 6/1994 | Sugawara | .......... A01K 89/0111 242/319 |
| 5,615,843 A * | 4/1997 | Takeuchi | ....... A01K 89/011221 242/319 |
| 6,149,089 A * | 11/2000 | Matsuda | ............ A01K 89/0111 242/319 |
| 6,176,446 B1* | 1/2001 | Sato | ............... A01K 89/011221 242/319 |

(Continued)

FOREIGN PATENT DOCUMENTS

| JP | 64-94782 U | 7/1979 |
| JP | 6-33467 U | 5/1994 |

(Continued)

OTHER PUBLICATIONS

European Search Report of corresponding EP Patent Application No. 17 18 5986.1 dated Jan. 25, 2018.

*Primary Examiner* — Michael E Gallion
(74) *Attorney, Agent, or Firm* — Global IP Counselors, LLP (57) ABSTRACT

A waterproof rotor drive unit structure includes a driveshaft that rotates a rotor, a reel body, a housing member, and a lid member that supports a pinion gear so as to be rotatable around a rotational axis of the driveshaft. A first annular projection is disposed on an outer peripheral end of a rotor-facing surface of the lid member, the first projection protruding toward the rotor entirely around the rotational axis. Second and third annular projections are disposed on (Continued)

an inner peripheral wall of the rotor at a distance from the first annular projection in the radial direction, the second and third projections protruding toward the lid member entirely around the rotational axis. The axial gap between the distal end of the first annular projection and the inner peripheral wall is less than or equal to the axial direction dimensions of the second and third annular projections.

16 Claims, 8 Drawing Sheets

(56) References Cited

U.S. PATENT DOCUMENTS

| | | | | |
|---|---|---|---|---|
| 6,598,817 | B2* | 7/2003 | Kitajima | A01K 89/0186 242/257 |
| 7,165,736 | B2* | 1/2007 | Kitajima | A01K 89/0114 242/245 |
| 7,234,660 | B2* | 6/2007 | Kitajima | A01K 89/0108 242/247 |
| 7,607,602 | B2* | 10/2009 | Hiraoka | A01K 89/0108 242/232 |
| 9,210,919 | B2* | 12/2015 | Hui | A01K 89/0111 |
| 2002/0023980 | A1* | 2/2002 | Matsuda | A01K 89/00 242/319 |
| 2007/0057104 | A1* | 3/2007 | Kitajima | A01K 89/0108 242/232 |
| 2008/0308663 | A1* | 12/2008 | Hiraoka | A01K 89/0108 242/233 |
| 2013/0206889 | A1* | 8/2013 | Ochiai | F16J 15/3204 242/322 |
| 2016/0106083 | A1* | 4/2016 | Niitsuma | A01K 89/0192 242/310 |

FOREIGN PATENT DOCUMENTS

| | | |
|---|---|---|
| JP | 2000-50772 A | 2/2000 |
| JP | 2013-162761 A | 8/2013 |
| JP | 2013-179882 A | 9/2013 |
| JP | 2015-112043 A | 6/2015 |
| JP | 2015-112044 A | 6/2015 |
| JP | 2015-112045 A | 6/2015 |
| JP | 2016-77232 A | 5/2016 |

* cited by examiner

ROTOR DRIVE UNIT WATERPROOF STRUCTURE AND SPINNING REEL

CROSS-REFERENCE TO RELATED APPLICATIONS

This application claims priority to Japanese Patent Application No. 2016-171163, filed on Sep. 1, 2016. The entire disclosure of Japanese Patent Application No. 2016-171163 is hereby incorporated herein by reference.

BACKGROUND

Field of the Invention

The present invention relates to a waterproof rotor drive unit structure of a spinning reel and a spinning reel.

Description of the Related Art

In a fishing reel, to obtain stable driving performance even in severe environments, in which water or the like can easily intrude, a waterproof structure is provided that can prevent intrusion of water into the rotor drive unit, which is inside a housing unit formed in a reel body. In such a waterproof structure, a lip seal or a labyrinth seal is used for maintaining rotation performance, Japanese Laid-Open Patent Publication No. 2015-112043 discloses a spinning reel comprising a first seal member and a second seal member. Since an inner peripheral surface of the second seal member is spaced apart from an outer peripheral surface of a tubular member that is integrally rotatable with a pinion gear, the second seal member does not obstruct the rotation of the tubular member, and the tubular member is able to be smoothly rotated. As a result, the pinion gear is also able to he smoothly rotated. Since the inner peripheral surface of the second seal member and the outer peripheral surface of the tubular member are water repellent, it is possible to suppress the intrusion of water, or the like, via a gap between the inner peripheral surface of the second seal member and the outer peripheral surface of the tubular member.

Japanese Laid-Open Patent Publication No. 2015-112044 discloses a spinning reel comprising a seal member, and an annular member that presses the seal member from the front. The inner peripheral surfaces of the seal member and of the annular member are water repellent. The annular member has a projecting portion, and the projecting portion is positioned at the inner peripheral side end of the annular member. Accordingly, it is possible to prevent water from intruding into the seal member by the projecting portion.

Japanese Laid-Open Patent Publication No. 2015-112045 discloses a spinning reel comprising a first seal member and a second seal member. The second seal member faces a tubular member that is integrally rotatable with a pinion gear, and comprises a first opposing surface and a second opposing surface, which are spaced apart from an outer peripheral surface of the tubular member; therefore, the second seal member does not obstruct the rotation of the tubular member, and the tubular member is able to be smoothly rotated. As a result, the pinion gear is also able to be smoothly rotated. The first opposing surface and the second opposing surface extend in mutually different directions, and a labyrinth structure is formed by the gap between the outer peripheral surface of the tubular member, which is water repellent, and the first opposing surface and the second opposing surface, which are water repellent; therefore, it is possible to suppress the intrusion of water or the like, via a gap between the second seal member and the tubular member.

Japanese Laid-Open Patent Publication No. 2016-77232 discloses a waterproof structure of a fishing reel, which comprises a reel body, a spool that is rotatable around a rotational axis of a spool shaft with respect to the reel body, a first abutting member, and a second abutting member. The first abutting member comprises a first main body portion that can abut the reel body, and at least one annular first protrusion that protrudes from the first main body portion. The second abutting member comprises a second main body portion that can abut the spool, and at least one annular second protrusion that is disposed adjacent to the first protrusion, with a predetermined first waterproof gap B1 therebetween. The second protrusion protrudes from the second main body portion, and is disposed adjacent to the first main body portion with a predetermined third waterproof gap B3 therebetween. The first protrusion and the second protrusion are adjacently disposed with a predetermined second waterproof gap B2 therebetween. By providing the first to the third waterproof gaps B1, B2, and B3 between the first abutting member and the second abutting member, fluid entering between the reel body and the spool can be prevented. Further, a water repellent treatment is applied to at least one of the first abutting member and the second abutting member.

However, while the waterproof structures disclosed in Japanese Laid-Open Patent Publication Nos. 2015-112043, 2015-112044, 2015-112045 and 2016-77232 seal the rotor side of the housing unit that accommodates the one-way clutch of the spinning reel, since water will intrude between the rotor and the housing unit, there is the possibility that the seal cannot completely prevent water from intruding from the opening.

SUMMARY

The present invention was made to solve the problem described above, and an object thereof is to make it difficult for water to intrude between a rotor and a housing unit that accommodates a one-way clutch of a spinning reel.

The rotor drive unit waterproof structure according to a first aspect of the present invention comprises: a driveshaft, to the front end of which is fixed a rotor for winding a fishing line onto a spool of a spinning reel, and that rotates the rotor; a housing unit that supports a driveshaft so as to be rotatable around the rotational axis of the driveshaft, having an opening into which is inserted the driveshaft, and that accommodates a rear end of the driveshaft and a one-way clutch that transmits the rotational torque of the driveshaft only in one direction; a first annular projection that is disposed on an outer peripheral end of a rotor-facing surface of the housing unit that faces the rotor in an axial direction parallel to the rotational axis, and that protrudes toward the rotor side in the axial direction on the entirely around the rotational axis; and a second annular projection that is rotated together with the driveshaft, disposed on an inner peripheral wall that faces the housing unit in the axial direction at a first distance from the first annular projection in the radial direction, and that protrudes toward the housing unit side in the axial direction on the entirely around the rotational axis; wherein, the axial gap between the distal end of the first annular projection and the inner peripheral wall is less than or equal to the axial direction dimension of the second annular projection.

Preferably, at least one of the first annular projection and the second annular projection has a water repellent surface.

The second annular projection is an annular member at has undergone a water repellent treatment and may be fixed to the rotor.

At least one of the first annular projection and the second annular projection may have a surface layer that is formed from an elastic body.

Preferably, a third annular projection disposed on the rotor-facing surface, with a radius smaller than the first annular projection and the second annular projection, and that protrudes toward the rotor side in the axial direction on the entirely around the rotational axis, and a fourth annular projection disposed on the inner peripheral wall at a second distance from the third annular projection in the radial direction, with a radius smaller than the first annular projection and the second annular projection, and that protrudes toward the housing unit side in the axial direction on the entirely around the rotational axis, are further provided, wherein the axial gap between the distal end of the third annular projection and the inner peripheral wall is less than or equal to the axial direction dimension of the fourth annular projection.

Preferably, at least one of the third annular projection and the fourth annular projection has a water repellent surface.

The fourth annular projection is an annular member that has undergone a water repellent treatment and may be fixed to the rotor.

At least one of the third annular projection and the fourth annular projection may have a surface layer that is formed from an elastic body.

Preferably, a first inner peripheral portion that is disposed on a driveshaft-facing surface of the housing unit that faces the driveshaft in the radial direction of the rotational axis, and that faces the outer periphery of the driveshaft across the entirely with a third distance therebetween in the radial direction, an inner periphery intermediate portion that is disposed on the driveshaft-facing surface, and that faces the outer periphery of the driveshaft across the entirely with a fourth distance, which is larger than the third distance, therebetween in the radial direction, on the rotor side of the first inner peripheral portion in the axial direction, and a second inner peripheral portion that is disposed on the driveshaft-facing surface and that faces the outer periphery of the driveshaft across the entirely with a fifth distance, which is smaller than the fourth distance, therebetween in the radial direction, on the rotor side of the inner periphery intermediate portion in the axial direction, are further provided.

Preferably, at least one of the first inner peripheral portion, the inner peripheral intermediate portion, the second inner peripheral portion, a portion that faces the first inner peripheral portion, a portion that faces the inner peripheral intermediate portion, and a portion that faces the second inner peripheral portion, have water repellent surfaces.

The driveshaft may include a rotor collar comprising a disc portion that is fixed, sandwiched between a boss portion of the rotor that is fitted to the driveshaft and an inner ring of the one-way clutch that is fitted to the driveshaft, a cylindrical portion that extends from the outer periphery of the disc portion toward the rotor side in the axial direction, and a circular ring portion that extends radially outwardly from the cylindrical portion around the rotational axis, and the inner peripheral wall may be formed in the circular ring portion.

The second annular projection may have a radius larger than the first annular projection, and be disposed at the outer peripheral end of the circular ring portion.

The housing unit may comprise a housing body that accommodates the one-way clutch and a cover plate that covers the inner peripheral wall side of the housing body, and the rotor-facing surface may be formed on the cover plate.

The spinning reel according to a second aspect of the present invention comprises a main body, a spool in which a shaft is cantilevered by the main body, a rotor that winds a fishing line onto the spool; and the rotor drive unit waterproof structure according to the first aspect.

According to the present invention, it is difficult for water to intrude between a rotor and a housing unit that accommodates a one-way clutch of a spinning reel.

DETAILED DESCRIPTION OF THE INVENTION

First Embodiment

Figure 1:
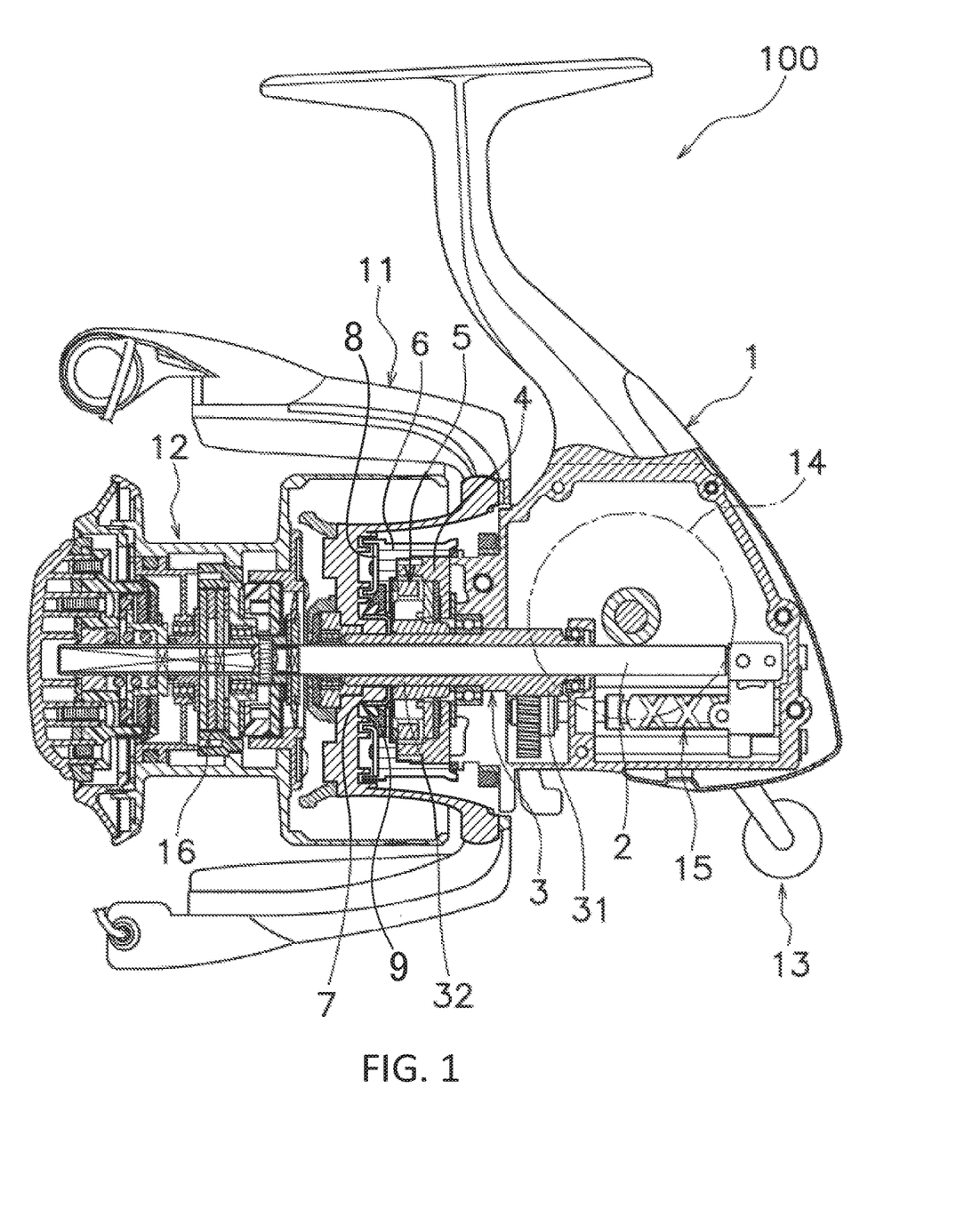
FIG. 1 is a cross-sectional view of a spinning reel according to a first embodiment of the present invention.

FIG. 1 is a cross-sectional view of a spinning reel according to the first embodiment of the present invention. The spinning reel 100 is attached to a fishing rod so that the left direction in FIG. 1 is oriented toward the distal end (front) of the fishing rod. The spinning reel 100 comprises a reel body 1, a rotor 11, a spool 12, and a handle 13. A fishing line that is wound on the spool 12 (not shown) is cast (i.e., unreeled) forward, that is, in the left direction in FIG. 1.

The rotor 11 is rotated by turning the handle 13, which is a crank. When the handle 13 is turned, the spool 12 is reciprocated in the longitudinal direction, in synchronization with the rotation of the rotor 11. By this operation, the unreeled fishing line is guided by the rotor 11 and evenly wound on the cylindrical surface of the spool 12.

The rotor 11 is fitted to an attaching portion 32 of the pinion gear 3 to be fixed to the pinion gear 3, and is rotated together with the pinion gear 3. The pinion gear 3 configures the driveshaft 3A in the present invention. The pinion gear 3 is rotatably supported. to the reel body 1 around the rotational axis of the driveshaft. The rotation axis of the driveshaft is determined by the direction in which the rotor 11 is rotated. Hereinafter, the direction that is parallel to the rotation axis of the driveshaft is referred to as the axial direction. The pinion gear 3 has a hollow tubular shape, and a spool shaft 2 extends through the pinion gear 3. The spool shaft 2 and the pinion gear 3 are relatively rotated and reciprocated. A spool 12 is mounted to the front end of the spool shaft 2 via a drag mechanism 16. The rear end of the spool shaft 2 is connected to an oscillating mechanism 15.

The handle 13 is a crank, and a drive gear 14 is attached to the crankshaft. The drive gear 14 is, for example, a bevel gear, which meshes with a gear portion 31 of the pinion gear 3. The oscillating mechanism 15 is rotated in synchronization with the pinion gear 3. When the oscillating mechanism 15 rotates, the spool shaft 2 reciprocates in the longitudinal direction. The rear end of the spool shaft 2, the gear portion 31 side of the pinion gear 3, the drive gear 14, and the oscillating mechanism 15 are accommodated in the reel body 1.

A one-way clutch 5 is disposed between the pinion gear 3 and the housing member 4 so that the pinion gear 3 is rotated only in one direction. The housing member 4 is fixed to the reel body 1. The inner ring of the one-way clutch 5 is fitted to the pinion gear 3 and rotated together with the pinion gear 3. The outer ring of the one-way clutch 5 is fitted and fixed to the housing member 4.

The one-way clutch 5 is, for example, a roller-type one-way clutch. A roller-type one-way clutch is formed from an outer ring, an inner ring, a roller, and a spring. cam surface is formed on the inner periphery of the outer ring or the outer periphery of the inner ring. The roller is disposed opposing the cam surface, and is kept, by a spring, in contact with the cam surface of the outer ring and the outer periphery of the inner ring, or with the cam surface of the inner ring and the inner periphery of the outer ring. When the inner ring tries to rotate in a direction in which the cam surface becomes narrow with respect to the outer ring, the contact surface pressure between the cam surface and the roller is increased, creating resistance, and the inner ring will not rotate with respect to the outer ring. When the inner ring tries to rotate in the reverse direction, the contact surface pressure between the cam surface and the roller is decreased, the roller rotates idly, and the inner ring will rotate with respect to the outer ring. As a result, the pinion gear 3 is rotated only in one direction.

The one-way clutch 5 is kept in an internal space of the housing member 4 by a lid member 6. The lid member 6 is attached in close contact with the outer periphery of the housing member 4, and a surface of the housing member 4 that faces the rotor 11 in the axial direction. The cover plate 8 is attached in close contact with a surface of the lid member 6 that faces the rotor 11 in the axial direction. Further, a rotor collar 7, which is formed in an annular shape around the outer periphery of the pinion gear 3 in the rotation direction, is fated on the pinion gear 3. The rotor collar 7 is rotated together with the pinion gear 3, and is a part of the driveshaft.

The rotor 11 and the rotor collar 7 are fitted to the front end of the pinion gear 3 so as to not rotate relative to each other. The reel body 1, the housing member 4, and the lid. member 6 accommodate the rear end of the pinion gear 3. The reel body 1, the housing member 4, the lid member 6, and the cover plate 8, are the housing unit in the present invention. The housing member 4 and the lid member 6 are the housing body in the present invention. The reel body 1, the housing member 4, the lid member 6, and the cover plate 8, may be collectively referred to as the housing unit. The housing member 4 and the lid member 6 may be collectively referred to as the housing body. The pillion gear 3, the boss portion of the rotor 11, and the rotor collar 7 protrude from the opening O of the housing unit. The housing body is fixed to the reel body 1.

In the spinning reel 100, as a waterproof rotor drive unit structure, an annular projection is formed on rotor-facing surfaces of the cover plate 8 and the lid member 6 opposing the rotor 11 in the axial direction, protruding toward the rotor 11 side in the axial direction on the entirely around the rotational axis of the driveshaft. An annular projection is formed on an inner peripheral wall that faces the housing unit in the axial direction of the rotor 11, which rotates together with the driveshaft, protruding toward the housing unit side in the axial direction on the entirely around the rotational axis of the driveshaft. The labyrinth structure that is formed by the annular projections of the cover plate 8 and the lid member 6, and the annular projection of the rotor 11, seals the gap between the rotor-facing surface of the housing unit and the inner peripheral wall of the rotor 11. In addition, an annular seal member 9 is disposed between the lid member 6 and the rotor collar 7 to seal the gap between the lid member 6 and the rotor collar 7. Next, details of the waterproof rotor drive unit structure will be described.

Figure 2:
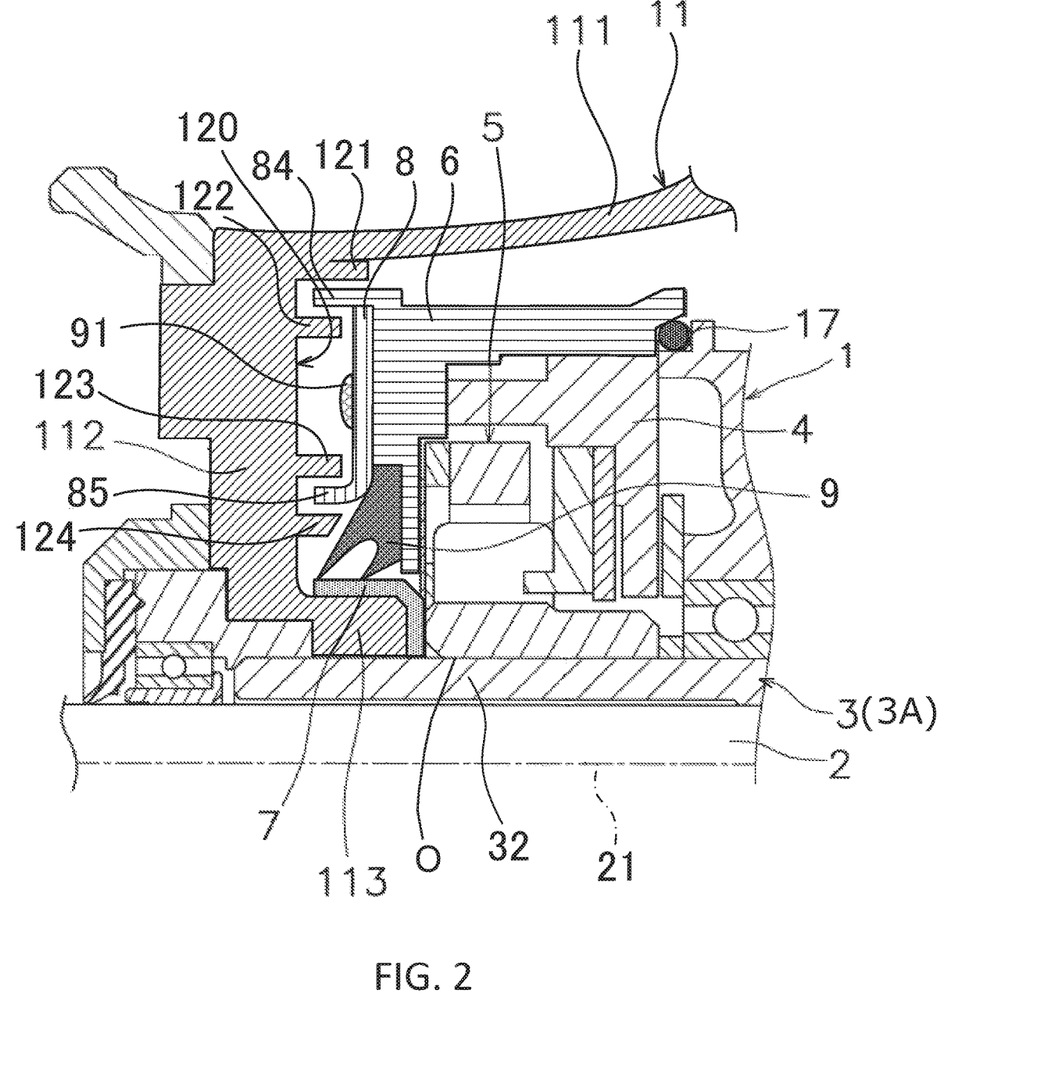
FIG. 2 is a cross-sectional view of the waterproof structure portion of the rotor drive unit according to the first embodiment.

FIG. 2 is an enlarged, partial cross-sectional view of the waterproof structure portion of the rotor drive unit according to the first embodiment. In FIG. 2, only one side is shown with respect to the center line 21 of the spool shaft 2. The center line 21 represents the rotational axis of the driveshaft. The rotor 11 is formed with a cylindrical portion 111, a wall portion 112, and a boss portion 113. The above can be integrally formed into one member. The cylindrical portion 111 is a cylindrical member and a housing space is formed therein. The wall portion 112 is formed in a circular plate shape, and the outer periphery of the wall portion 112 is connected to the inner periphery of the cylindrical portion 111. An annular projection 121, and annular projections 122, 123, and 124, are formed on an inner peripheral wall 120 of the wall portion 112 that faces the housing unit in the axial direction. The boss portion 113 extends from the inner peripheral side of the wall portion 112 to the housing unit side. The boss portion 113 is fitted and fixed to the attaching portion 32 of the pinion gear 3, and the rotor 11 is rotated together with the pinion gear 3.

The housing member 4 is fixed to the front of the reel body 1. The one-way clutch 5 is accommodated in an internal space of the housing member 4. The lid member 6 is an annular member formed with a cylindrical portion that covers the outer periphery of the housing member 4, and a lid portion that covers the surface of the housing member 4 that faces the rotor 11 in the axial direction. The lid member 6 regulates the movement of the one- way clutch 5 in the axial direction, and holds the one-way clutch 5 in the internal space of the housing member 4. The housing member 4 and the lid member 6 can be integrally formed. The lid member 6 has an annular projection 84 (e.g., in one embodiment, a first annular projection) on the outer peripheral end of the rotor-facing surface. An O-ring 17 is interposed between the reel body I and the end of the cylindrical portion of the lid member 6. It is thereby possible to suppress intrusion of water between the lid member 6 and the reel body 1.

The cover plate 8 is an annular member that extends radially outwardly around the rotational axis of the driveshaft to cover the inner peripheral wall 120 side of the housing body. The cover plate 8 comprises an annular projection 85 on the rotor-facing surface. The cover plate 8 is fixed to the lid member 6 by, for example, a screw 91. The screw 91 comprises a threaded portion that is screwed into a screw hole formed in the lid member 6 and a screw head that presses the cover plate 8.

The annular projection 84 disposed on the outer peripheral end of the rotor-facing surface of the lid member 6 protrudes toward the rotor 11 side in the axial direction on the entirely around the rotational axis of the driveshaft. The annular projections 121 and 122 (e.g., in one embodiment, a second annular projection) of the wall portion 112 are respectively disposed at a first distance from the annular projection 84 of the lid member 6 in the radial direction, and protrude toward the housing unit in the axial direction on the entirely around the rotational axis of the driveshaft. Either one of the annular projections 121 or 122 may be used. The annular projection 84 of the lid member 6 is the first annular projection in the present invention, and the annular projections 121 and 122 of the wall portion 112 are the second annular projection in the present invention.

The annular projection 85 disposed on the rotor-facing surface of the cover plate 8 has a smaller radius than the annular projection 122 of the wall portion 112, and. protrudes toward the rotor 11 in the axial direction on the entirely around the rotational axis of the driveshaft. The annular projection 123 (e.g., in one embodiment, a second annular projection) and the annular projection 124 of the wall portion 112 are respectively disposed at a second distance from the annular projection 85 of the cover plate 8 in the radial direction, and protrude toward the housing unit in the axial direction across the entirely around the rotational axis of the driveshaft. Either one of the annular projections 123 or 124 may be used. The annular projection 85 of the cover plate 8 is the third annular projection in the present invention, and the annular projections 123 and 124 of the wall portion 112 are the fourth annular projection in the present invention.

Figure 3A:
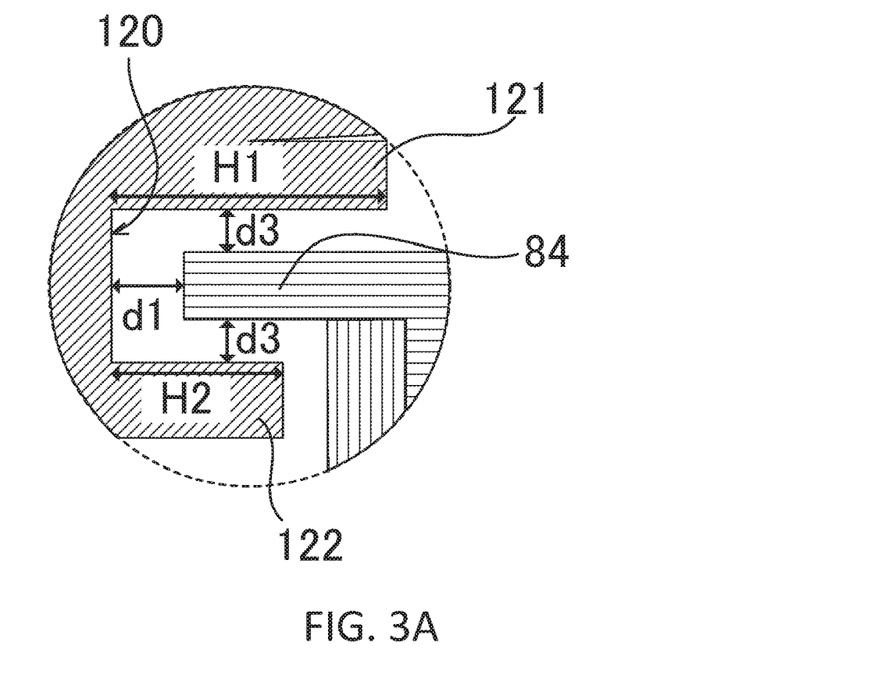
FIGS. 3A and 3B are partial, enlarged cross-sectional views of the annular projections according to the first embodiment.
Figure 3B:
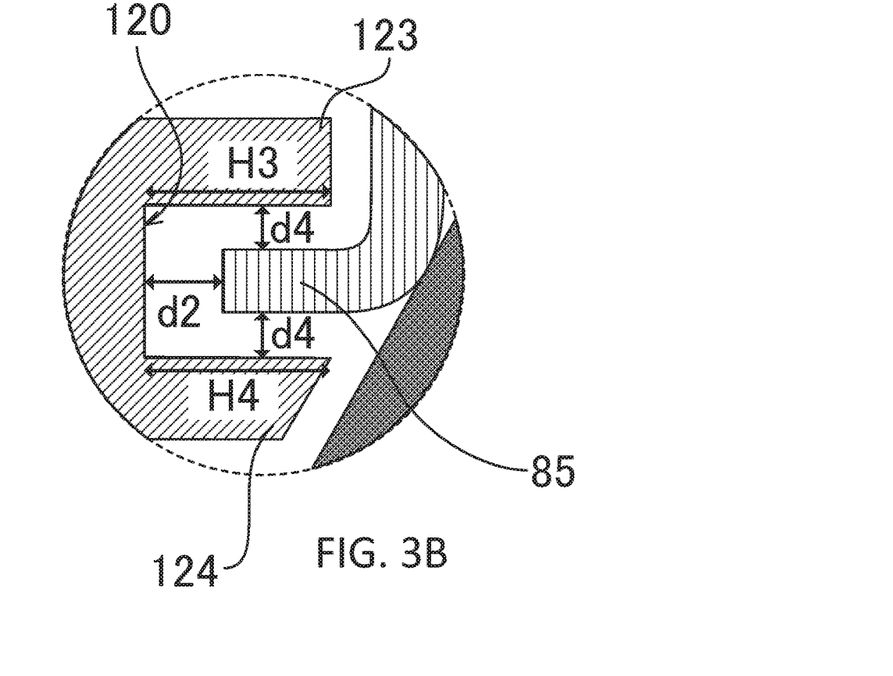

FIGS. 3A and 3B are enlarged views of the annular projections according to the first embodiment. FIG. 3A is an enlarged view of the annular projections 84, 121, and 122 portions. The axial gap d1 between the distal end of the annular projection 84 and the inner peripheral wall 120 is less than or equal to the axial dimension H1 of the annular projection 121 and the axial dimension H2 of the annular projection 122. FIG. 3B is an enlarged view of the annular projections 85, 123, and 124 portions. The axial gap d2 between the distal end of the annular projection 85 and the inner peripheral wall 120 is less than or equal to the axial dimension H3 of the annular projection 123 and the axial dimension H4 of the annular projection 124. The first distance d3 between the annular projection 121, as well as the annular projections 122 and 84 in the radial direction, shown in FIG. 3A, is preferably smaller than the axial gap d1 between the distal end of the annular projection 84 and the inner peripheral wall 120. The second distance d4 between the annular projection 123, as well as the annular projection 124 and the annular projection 85 in the radial direction, shown in FIG. 3B, is preferably smaller than the axial gap d2 between the distal end of the annular projection 85 and the inner peripheral wall 120.

The annular projection 84 of the lid member 6 and the annular projection 85 of the cover plate 8, and the annular projections 121, 122, 123, and 124 of the wall portion 112 of the rotor 11, form a labyrinth structure. With such a labyrinth structure, water that intrudes from the gap between the housing unit and the rotor 11 is blocked in multiple stages. Further, to improve the waterproof effect, at least one of the annular projections 84, 121, and 122, preferably has a water repellent surface. Further, at least one of the annular projections 85, 123, and 124, preferably has a water repellent surface.

If a sufficient waterproof effect can be obtained by the annular projections 84, 121, and 122, the annular projection 85 may be omitted. If the annular projection 85 is absent, the annular projections 123 and 124 may be omitted.

The rotor collar 7 shown in FIG. 2 comprises a disc portion that is fixed, sandwiched between the boss portion 113 of the rotor 11 and an inner ring of the one-way clutch 5 that is fitted to the pinion gear 3, and a cylindrical portion that extends from the outer periphery of the disc portion toward the rotor 11 in the axial direction. The rotor collar 7 is fitted to the pinion gear 3 at the inner periphery of the disc portion, and the outer peripheral surface of the rotor collar 7 is defined by the fitting of the rotor collar 7 and the pinion gear 3.

An annular seal member 9 comprising two lip portions is disposed between the lid member 6 and the rotor collar 7. The seal member 9 is formed from a material having elasticity, such as synthetic rubber. The lip portions of the seal member 9 are formed such that the thickness is reduced toward the inner peripheral side, and the surface thereof is water repellent. The lip portions are inclined toward the rotor 11 in the axial direction, toward the inner peripheral side. In FIG. 2, there are two lip portions of the seal member 9, but no limitation is imposed thereby; there may be one, or three or more lip portions of the seal member 9.

According to the rotor drive unit waterproof structure of the first embodiment, the annular projection 84 of the lid member 6 and the annular projection 85 of the cover plate 8, and the annular projection 121, the annular projection 122, the annular projection 123, and the annular projection 124 of the wall portion 112 of the rotor 11, form a labyrinth structure, and water that intrudes into the gap between the housing unit and the rotor 11 is blocked in multiple stages. In particular, the labyrinth structure that is formed by the annular projection 84, which is formed on the outer peripheral end of the rotor-facing surface of the lid member 6, and the annular projection 121 and the annular projection 122, which are formed on the inner peripheral wall 120, seals the gap between the outer peripheral end of the housing unit and the rotor 11, and it is difficult for water to intrude between the housing unit and the rotor 11. Further, since a seal member 9 is disposed between the lid member 6 and the rotor collar 7, it is possible to suppress the intrusion of water from the gap between the lid member 6 and the rotor collar 7. If at least one of the annular projection 84, the annular projection 85, the annular projection 121, the annular projection 122, the annular projection 123, and the annular projection 124, is configured to have a water repellent surface, the waterproof effect is further improved.

Second Embodiment

Figure 4:
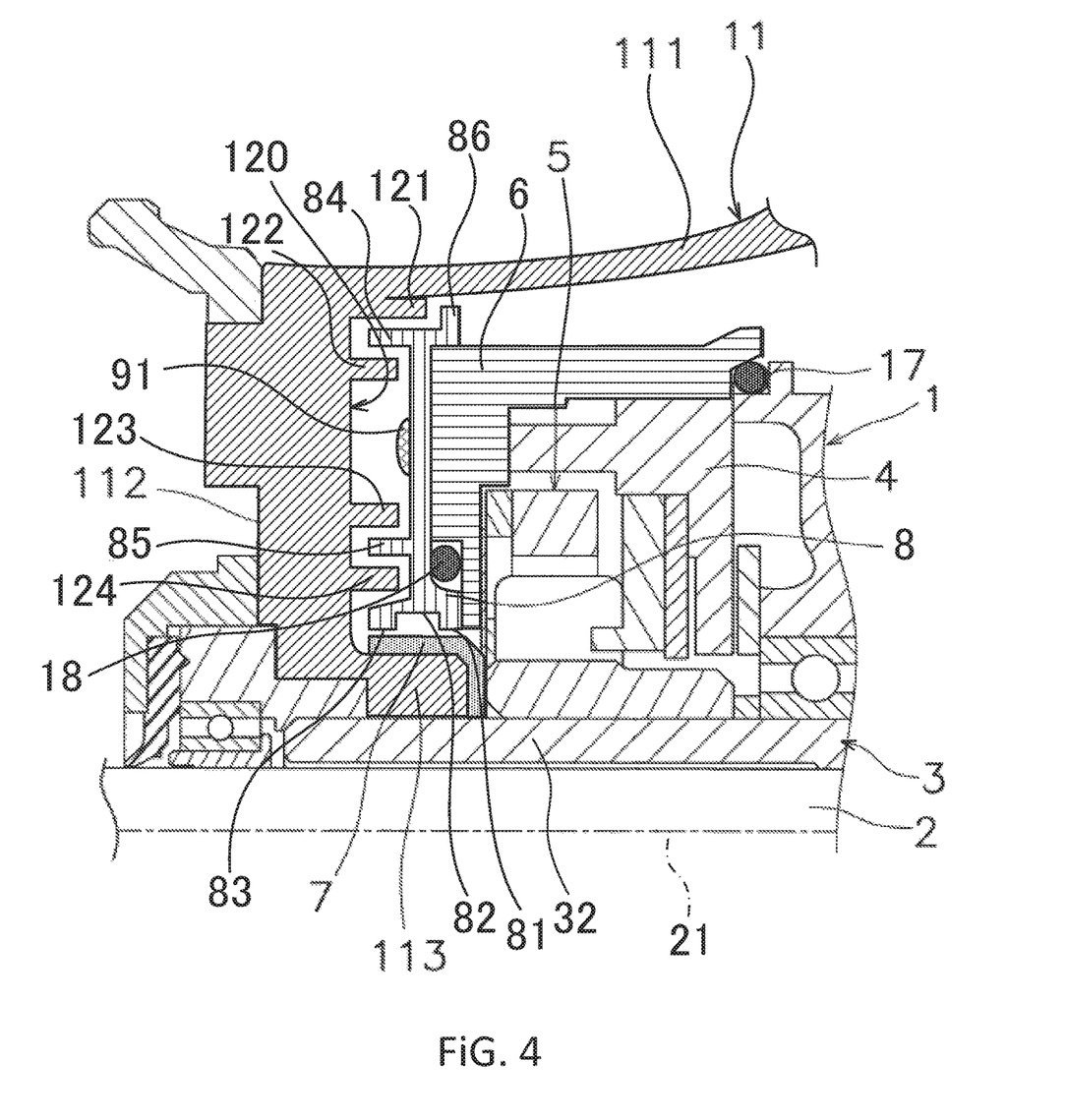
FIG. 4 is a partial, cross-sectional view of the waterproof structure portion of the rotor drive unit according to a second embodiment of the present invention.

FIG. 4 is a partial cross-sectional view of the waterproof structure portion of the rotor drive unit according to a second embodiment of the present invention. In FIG. 4, only one side is shown with respect to the centerline 21 of the spool shaft 2. In the second embodiment, the seal member 9 is not included, and a labyrinth structure is foamed by a driveshaft-facing surface of the cover plate 8 which faces the rotor collar 7 in the radial direction of the rotational axis of the driveshaft, and an outer peripheral surface of the rotationally driven rotor collar 7, to seal the gap between the lid member 6 and the rotor collar 7. Further, in the second embodiment, the annular projection 84 is also formed on the cover plate 8. The other configurations are the same as in the first embodiment.

An inner peripheral portion 81, an inner peripheral intermediate portion 82, and an inner peripheral portion 83 are formed on the driveshaft-facing surface of the cover plate 8. The inner peripheral portion 81 faces the outer periphery of the rotor collar 7, which configures the driveshaft, at a third distance therefrom in the radial direction across the entirely. The inner peripheral intermediate portion 82 faces the outer periphery of the driveshaft across the entirely, at a fourth distance, which is larger than the third distance, therebetween in the radial direction, on the rotor 11 side of the inner peripheral portion 81 in the axial direction. The inner peripheral portion 83 faces the outer periphery of the driveshaft across the entirely, at a fifth distance, which is larger than the fourth distance, therebetween in the radial direction, on the rotor 11 side of the inner peripheral intermediate portion 82 in the axial direction. The inner peripheral portion 81, the inner peripheral intermediate portion 82, and the inner peripheral portion 83 are, respectively, the first inner peripheral portion, the inner peripheral intermediate portion, and the second inner peripheral portion, in the present invention.

In addition to the annular projection 85, the cover plate 8 comprises an annular projection 84 that is disposed on the outer peripheral end of the rotor-facing surface, and that protrudes toward the rotor 11 side in the axial direction across the entirely around the rotational axis of the driveshaft. Further, an outer peripheral projection 86 is formed on the cover plate 8 so as to extend radially outwardly over the entirely around the rotational axis of the driveshaft. The surface of the outer peripheral projection 86 that faces the rotor 11 in the axial direction faces the distal end of the annular projection 121. By providing an outer peripheral projection 86 in this manner, the portion where the clearance is congested is extended, improving the waterproof performance. The outer peripheral projection 86 may be formed on the lid member 6 as well. An O-ring 18 is interposed between the lid member 6 and the cover plate 8. It is thereby possible to suppress intrusion of water from between the lid member 6 and the cover plate 8. Further, in order to improve the waterproof effect, at least one of the inner peripheral portion 81, the inner peripheral intermediate portion 82, the inner peripheral portion 83, the outer peripheral surface of the rotor collar 7 that faces the inner peripheral portion 81, the outer peripheral surface of the rotor collar 7 that faces the inner peripheral intermediate portion 82, and the outer peripheral surface of the rotor collar 7 that faces the inner peripheral portion 83, preferably has a water repellent surface.

According to the waterproof rotor drive unit structure of the second embodiment, water that intrudes from the gap between the housing unit and the rotor 11 is further blocked in multiple stages, by the labyrinth structure that is formed by the inner peripheral portion 81, the inner peripheral intermediate portion 82, and the inner peripheral portion 83 of the cover plate 8, and the outer peripheral surface of the rotor collar 7. If at least one of the inner peripheral portion 81, the inner peripheral intermediate portion 82, the inner peripheral portion 83, the outer peripheral surface of the rotor collar 7 that faces the inner peripheral portion 81, the outer peripheral surface of the rotor collar 7 that faces the inner peripheral intermediate portion 82, and the outer peripheral surface of the rotor collar 7 that faces the inner peripheral portion 83, is configured to have a water repellent surface, the waterproof effect is further improved. Further, by providing a cover plate 8 that has the annular projection 84 and the annular projection 85 as a separate body, it is possible to attach to the lid member 6 so that the centers of the annular projection 84 and the annular projection 85 match the rotational axis of the driveshaft. Since the annular projection 84 and the annular projection 85 can thereby be precisely arranged, it is possible to decrease the first space and the second space, reducing the clearance and further improving the waterproof effect.

Third Embodiment

Figure 5:
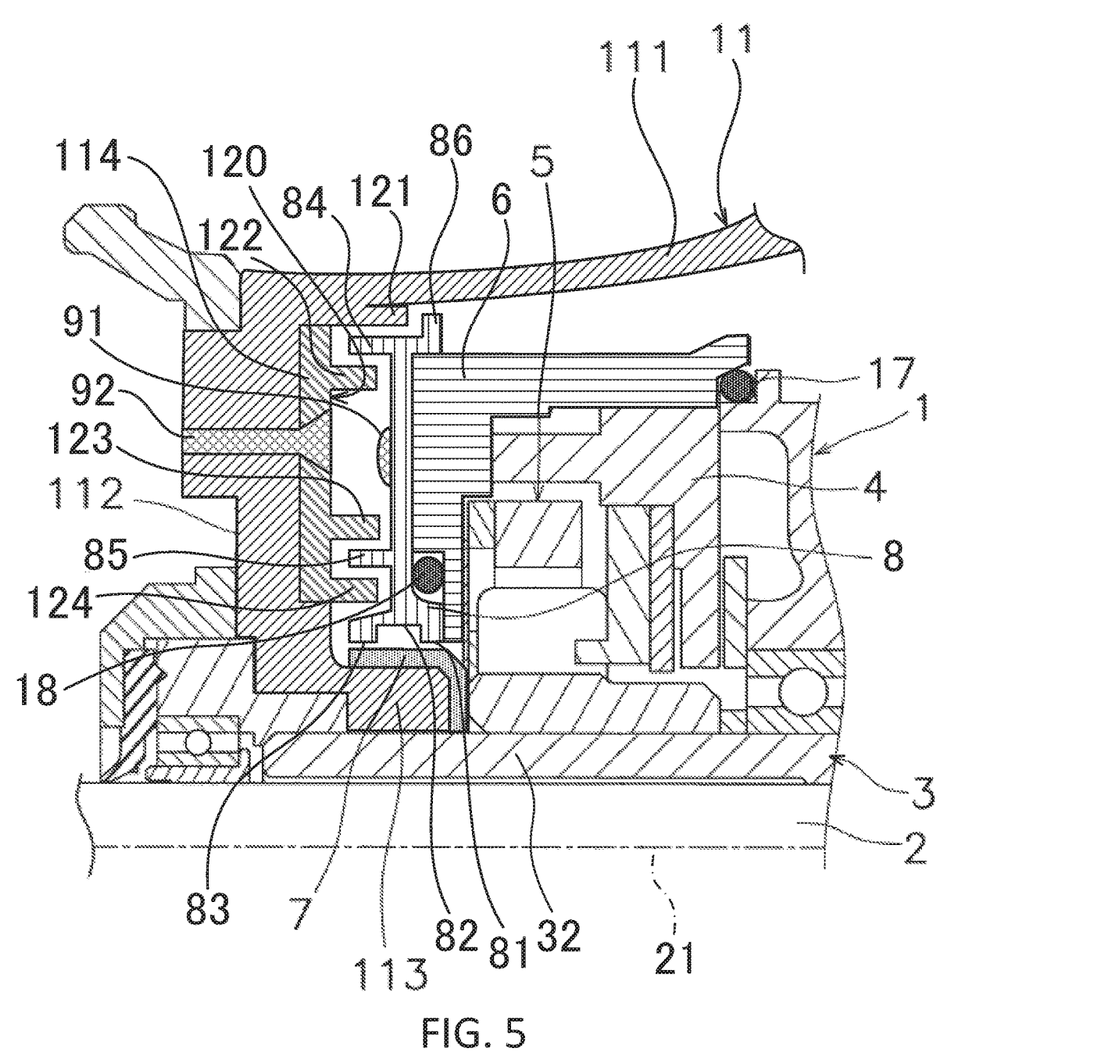
FIG. 5 is a partial, cross-sectional view of the waterproof structure portion of the rotor drive unit according to a third embodiment of the present invention.

FIG. 5 is a partial cross-sectional view of the waterproof structure portion of the rotor drive unit according to a third embodiment of the present invention. In FIG. 5, only one side is shown with respect to the center line 21 of the spool shaft 2. In the third embodiment, an annular member 114 around the rotational axis of the driveshaft is fixed to a wall portion 112 of the 11 by a fastening member 92. For example, two or more fastening members 92 are arranged at equal intervals on a circumference around the rotational axis of the driveshaft. In the third embodiment, the annular projection 122, the annular projection 123, and the annular projection 124, are formed on the annular member 114. In the present embodiment, the inner peripheral wall 120 is formed on the annular member 114. Since the annular member 114 is fixed to the wall portion 112 of the rotor 11 by a fastening member 92, the annular member can be considered as a part of the wall portion 112 of the rotor 11.

By applying a water repellent treatment to the annular member 114 in advance, it is possible to configure the surfaces of the annular projection 122, the annular projection 123, and the annular projection 124 to have water repellency. Here, the annular projection 121 is formed on the wall portion 112, but it may be formed on the annular member 114. The other configurations are the same as in the second embodiment.

According to the rotor drive unit waterproof structure of the third embodiment, it is possible to deal with cases in which a rib cannot be disposed on the rotor 11, due to reasons such as the structure of the mold, or the like. Further, by fixing an annular member 114 subjected to water repellent treatment in advance to a wall portion 112 of the rotor 11, it is possible to prevent water repellent from adhering to the external surface of the rotor 11. Furthermore, by forming an annular member 114 comprising an annular projection 122, an annular projection 123, and an annular projection 124, as a separate body, it is possible to attach to the rotor 11 so that the centers of the annular projection 122, the annular projection 123, and the annular projection 124, match the rotational axis of the driveshaft. Since the annular projections 122, 123, and 124 can thereby be precisely arranged, it is possible to decrease the first space and the second space, reducing the clearance and further improving the waterproofing effect.

Fourth Embodiment

Figure 6:
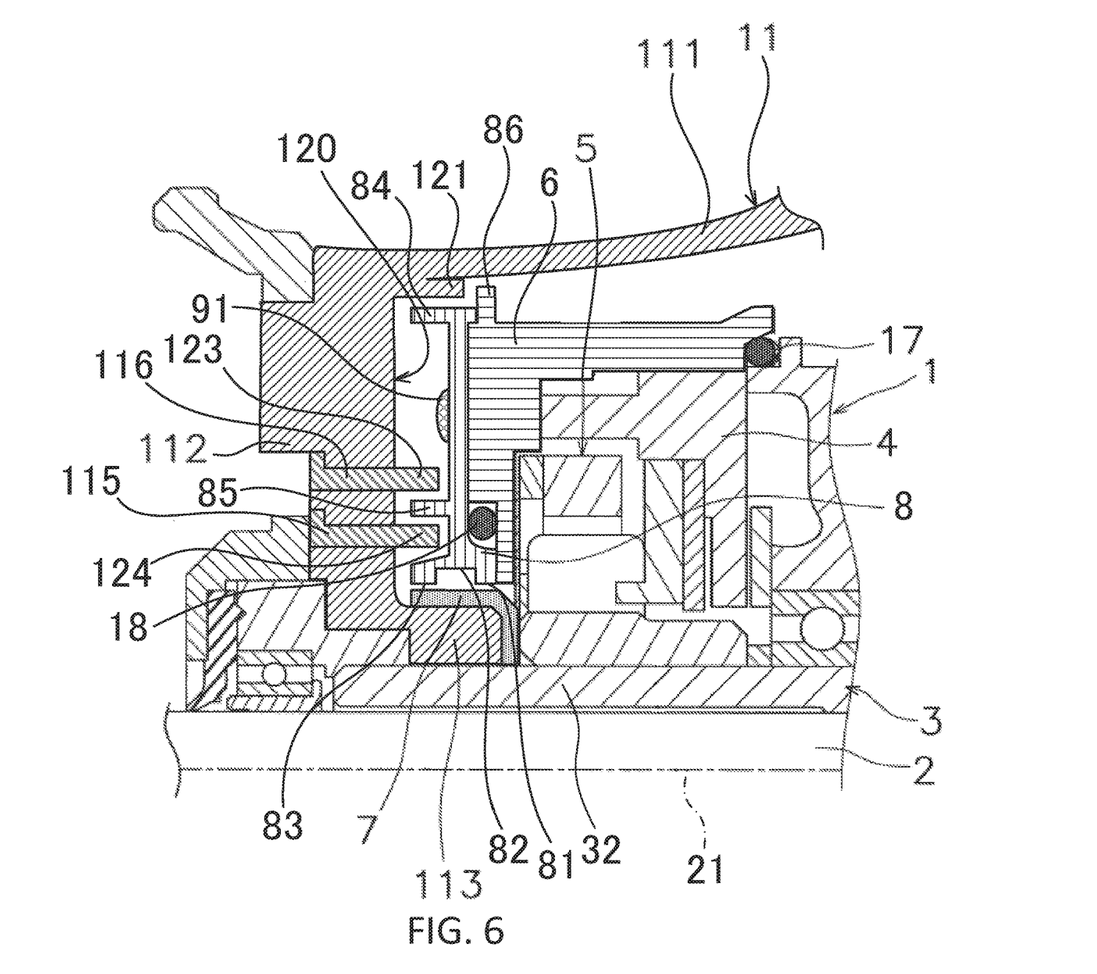
FIG. 6 is a partial, cross-sectional view of the waterproof structure portion of the rotor drive unit according to a fourth embodiment of the present invention.

FIG. 6 is a partial cross-sectional view of the waterproof structure portion of the rotor drive unit according to a fourth embodiment of the present invention. In FIG. 6, only one side is shown with respect to the centerline 21 of the spool shaft 2. In the fourth embodiment, annular members 115 and 116 are fitted and caulked to the wall portion 112 of the rotor 11. Two or more projections are respectively arranged on the circumferences of the annular members 115 and 116 at equal intervals. Projections that extend through the wall portion 112 are bent to fix the annular members 115 and 116.

The annular members 115 and 116 that protrude from the wall portion 112 of the rotor 11 to the cover plate 8 in the axial direction, respectively, form the annular projections 123 and 124. By applying a water repellent treatment to the annular members 115 and 116 in advance, it is possible for the surfaces of the annular projections 123 and 124 to be water repellent. The outer peripheral projection 86 is formed on the lid member 6. Here, the annular projection 121 is formed on the wall portion 112, but the annular projection 121 may be formed by an annular member in the same manner. Further, the annular projection 121 may be formed of an annular member, and the annular projections 123 and 124 may be formed on the wall portion 112. In the present embodiment, an annular projection 122 is not disposed on the inner peripheral wall 120. The other configurations are the same as in the second embodiment.

Figure 7:
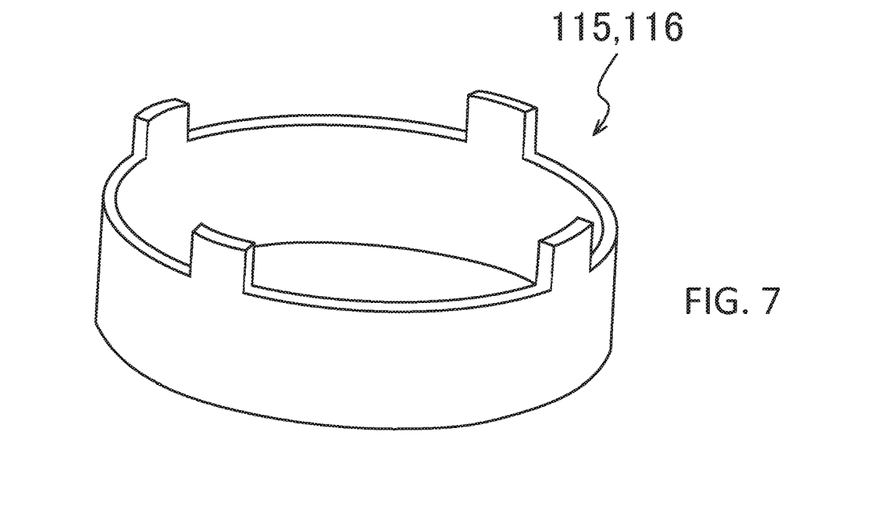
FIG. 7 is a perspective view of the annular member according to the fourth embodiment.

FIG. 7 is a perspective view of the annular member according to the fourth embodiment. In the example shown in FIG. 7, four projections are arranged on the circumferences of the annular members 115 and 116 at equal intervals. The projections of the annular members 115 and 116 are fitted in holes in the wall portion 112 of the rotor 11 in advance, and the projections that extend through the wall portion 112 are bent to fix the annular members 115 and 116. Only the projection portions of the annular members 115 and 116 extend through the wall portion 112.

According to the waterproof rotor drive unit structure of the fourth embodiment, it is possible to deal with cases in which a rib cannot be disposed on the rotor 11, due to reasons such as the structure of the mold, or the like. Further, by fixing annular members 115 and 116 and subjecting wall portion 112 of the rotor 11 to a water repellent treatment in advance, it is possible to prevent the water repellent from adhering to the external surface of the rotor 11.

Fifth Embodiment

Figure 8:
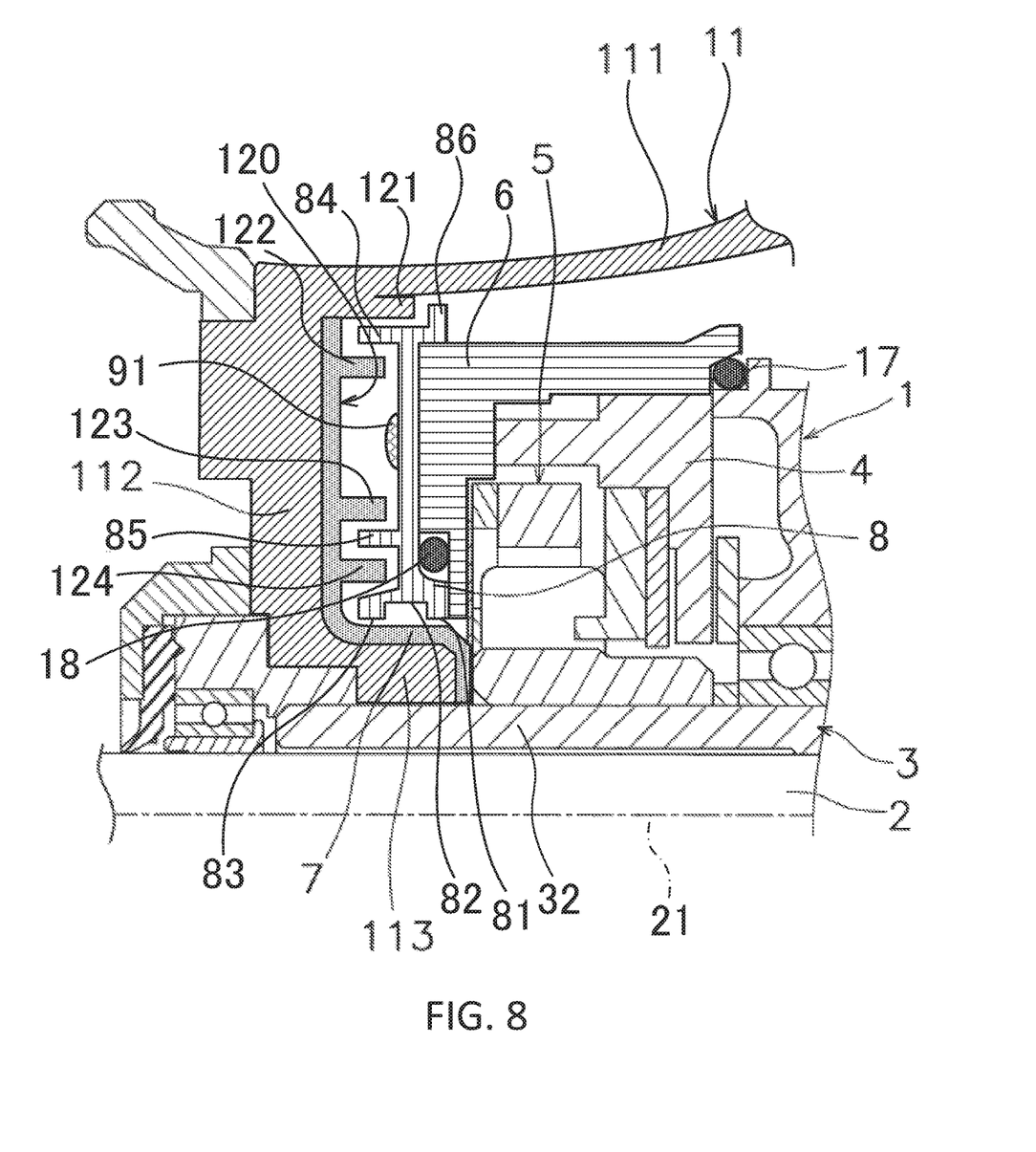
FIG. 8 is a partial, cross-sectional view of the waterproof structure portion of the rotor drive unit according to a fifth embodiment of the present invention.

FIG. 8 is a partial cross-sectional view of the waterproof structure portion of the rotor drive unit according to the fourth embodiment of the present invention. In FIG. 8, only one side is shown with respect to the centerline 21 of the spool shaft 2. In the fifth embodiment, the rotor collar 7 comprises a disc portion that is fixed, sandwiched between the boss portion 113 of the rotor 11 and an inner ring of the one-way clutch 5 that is fitted to the pinion gear 3, a cylindrical portion that extends from the outer periphery of the disc portion toward the rotor 11 in the axial direction, and a circular ring portion that extends radially outwardly from the cylindrical portion around the rotational axis of the driveshaft. In the fifth embodiment, the annular projections 122, 123, and 124, are formed on the circular ring portion of the rotor collar 7. Here, the annular projection 121 is formed on the wall portion 112, but may be formed on the circular ring portion of the rotor collar 7. In the present embodiment, the inner peripheral wall 120 is formed on the circular ring portion of the rotor collar 7, which rotates together with the driveshaft. Since the rotor collar 7 is rotated together with the pinion gear 3, the circular ring portion may be considered part of the wall portion 112 of the rotor 11. The other configurations are the same as in the second embodiment.

According to the rotor drive unit waterproof structure of the fifth embodiment, it is possible to deal with cases in which a rib cannot be disposed on the rotor 11, due to reasons such as the structure of the mold, or the like. Further, it is possible to reduce the cost by forming the rotor collar 7 by drawing and outsert molding. Furthermore, by fixing a rotor collar 7 subjected to a water repellent treatment in advance to the rotor 11, it is possible to prevent the water repellent from adhering to the external surface of the rotor 11. Further, by disposing annular projections 122, 123, and 124 on the rotor collar 7, it is possible to attach the rotor collar 7 so that the centers of the annular projections 122, 123, and 124, match the rotational axis of the driveshaft. Since the annular projections 122, 123, and 124 can thereby be precisely arranged, it is possible to decrease the first space and the second space, reducing the clearance and further improving the waterproof effect.

Sixth Embodiment

Figure 9:
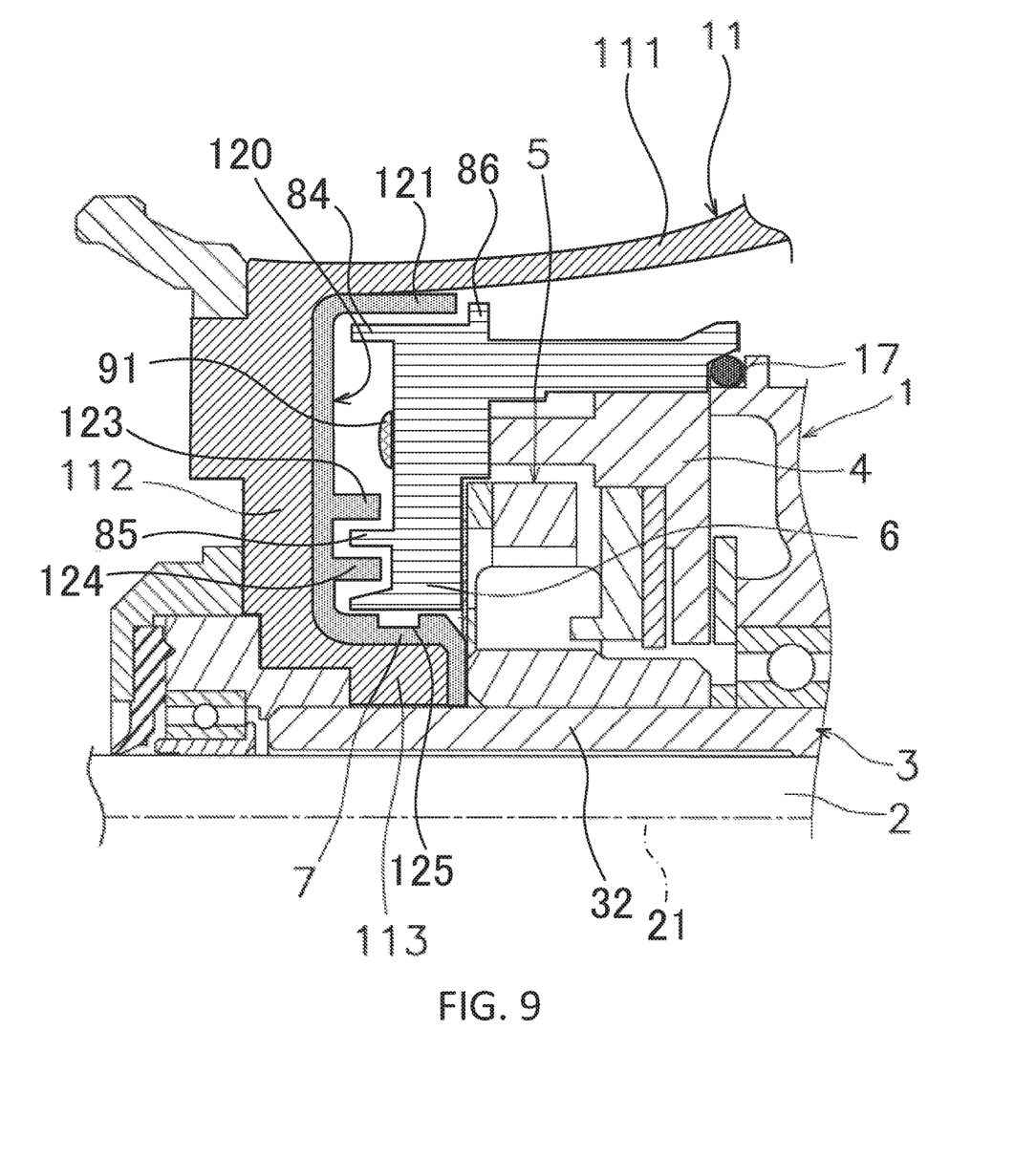
FIG. 9 is a partial, cross-sectional view of the waterproof structure portion of the rotor drive unit according to a sixth embodiment of the present invention.

FIG. 9 is a partial cross-sectional view of the waterproof structure portion of the rotor drive unit according to a sixth embodiment of the present invention. In FIG. 9, only one side is shown with respect to the centerline 21 of the spool shaft 2. In the sixth embodiment, a cover plate 8 is not provided, and a lid member 6 comprising an annular projection 84 and an annular projection 85 is provided. The lid member 6 is fixed to the housing member 4 by, for example, a screw 91. The driveshaft-facing surface of the lid member 6 that faces the outer surface of the rotor collar 7 is a flat surface. The outer peripheral projection 86 is formed on the lid member 6. The rotor collar 7 comprises a cylindrical portion and a circular ring portion, in the same manner as the fifth embodiment. Further, a groove 125 recessed in the radial direction on the entirely around the rotational axis of the driveshaft is formed in the rotor collar 7 in a portion that faces the driveshaft-facing surface of the lid member 6. A labyrinth structure is formed by the driveshaft-facing surface of the lid member 6 and the groove 125 of the rotor collar 7.

In the sixth embodiment, the annular projections 121, 123, and 124, are formed on the circular ring portion of the rotor collar 7. In the present embodiment, an annular projection 122 is not disposed on the inner peripheral wall 120. The annular projection 121 has a larger radius than the annular projection 84, and is disposed on the outer peripheral end of the circular ring portion of the rotor collar 7. Further, an outer peripheral projection 86 is formed on the lid member 6. The other configurations are the same as in the fifth embodiment.

According to the waterproof rotor drive unit structure of the sixth embodiment, an O-ring 18 is unnecessary since a cover plate 8 is not provided. Further, it is possible to reduce the cost by forming the rotor collar 7 by drawing and outsert molding. Furthermore, by providing the annular projection 121 at the outer peripheral end of the circular ring portion of the rotor collar 7, the portion where the clearance is congested is extended, improving the waterproof performance. Further, by disposing annular projections 121, 123, and 124 on the rotor collar 7, it is possible to attach the rotor collar 7 so that the centers of the annular projections 121, 123, and 124, match the rotational axis of the driveshaft. Since the annular projections 121, 123, and 124 can thereby be precisely arranged, it is possible to decrease the first space and the second space, reducing the clearance and further improving the waterproof effect.

Meanwhile, since an O-ring 17 is interposed between the end of the cylindrical portion of the lid member 6 and the reel body 1, the space between the lid member 6 and the reel body 1 is waterproofed, and if the attachment position of the lid member 6 can be adjusted, it becomes possible to attach to the lid member 6 to the housing member 4 so that the centers of the annular projections 84 and 85 match the rotational axis of the driveshaft. Since the annular projections 84 and 85 can thereby be precisely arranged, it is possible to decrease the first space and the second space, reducing the clearance and further improving the waterproof effect.

In the first to the sixth embodiments, at least one of the annular projections 84, 121, and 122, may have a surface layer that is formed from an elastic body. Further, at least one of the annular projections 85, 123, and 124, may have a surface layer that is formed from an elastic body. Accordingly, a malfunction will not occur even if the portion forming a labyrinth structure comes in contact; therefore, the clearances can be reduced, and the waterproof performance is improved.

The first to the sixth embodiments may be appropriately combined. For example, the driveshaft-facing surface of the cover plate 8 in the second to the fifth embodiments may be formed into a flat surface, and a groove 125 that is recessed in the radial direction in the entirely around the rotational axis of the driveshaft may be formed in the rotor collar 7, in a portion that faces the driveshaft-facing surface of the cover plate 8, as in the sixth embodiment. The cover plate 8 in the second to the fifth embodiments may be configured such that an inner peripheral portion 81, an inner peripheral intermediate portion 82, and an inner peripheral portion 83 are not formed on the driveshaft-facing surface, and that an annular seal member 9 is disposed between the lid member 6 and the rotor collar 7, as in the first embodiment. In the first to the fifth embodiments, a cover plate 8 may not be formed as a separate body, and a lid member 6 comprising annular projections 84 and 85 may he used as in the sixth embodiment. In the first to the sixth embodiments, the cover plate 8, the lid member 6, and the housing member 4 may all be integrally formed.

What is claimed is:

1. A waterproof rotor drive unit structure, comprising:
a driveshaft having a front end configured to be fixed to a rotor for winding a fishing line onto a spool of a spinning reel, the driveshaft configured to rotate the rotor;
a housing unit supporting the driveshaft so as to be rotatable around a rotational axis of the driveshaft, having an opening into which the driveshaft is inserted, and housing a rear end of the driveshaft and a one-way clutch configured to transmit rotational torque of the driveshaft only in one direction;
a first annular projection extending from an outer periphery of a rotor-facing surface of the housing unit, the first annular projection being configured to be faced to the rotor in an axial direction parallel to the rotational axis and protrude toward the rotor in the axial direction entirely around the rotational axis; and,
a second annular projection configured to rotate together with the driveshaft, the second annular projection on an inner peripheral wall that faces the housing unit in the axial direction at a first distance from the first annular projection in a radial direction, and protruding toward the housing unit in the axial direction entirely around the rotational axis,
the first and second annular projections protruding toward each other and in opposite directions, and
an axial gap between a distal end of the first annular projection and the inner peripheral wall being less than or equal to an axial direction dimension of the second annular projection.

2. The waterproof rotor drive unit structure recited in claim 1, wherein
at least one of the first annular projection and the second annular projection has a water repellent surface.

3. The waterproof rotor drive unit structure recited in claim 1, wherein
the second annular projection is an annular member that has undergone a water repellent treatment, and is fixed to the rotor.

4. The waterproof rotor drive unit structure recited in claim 1, wherein
at least one of the first annular projection and the second annular projection has a surface layer that is formed from an elastic body.

5. A waterproof rotor drive unit structure, comprising:
a driveshaft having a front end configured to be fixed to a rotor for winding a fishing line onto a spool of a spinning reel, the driveshaft configured to rotate the rotor;
a housing unit supporting the driveshaft so as to be rotatable around a rotational axis of the driveshaft, having an opening into which the driveshaft is inserted, and housing a rear end of the driveshaft and a one-way clutch configured to transmit rotational torque of the driveshaft only in one direction:
a first annular projection extending from an outer periphery of a rotor-facing surface of the housing unit, the first annular projection being configured to be faced to the rotor in an axial direction parallel to the rotational axis and protrude toward the rotor in the axial direction entirely around the rotational axis;
a second annular projection configured to rotate together with the driveshaft, the second annular projection on an inner peripheral wall that faces the housing unit in the axial direction at a first distance from the first annular projection in a radial direction, and protruding toward the housing unit in the axial direction entirely around the rotational axis,
the first and second annular projections protruding toward each other and in opposite directions,
an axial gap between a distal end of the first annular projection and the inner peripheral wall being less than or equal to an axial direction dimension of the second annular projection:
a third annular projection on the rotor-facing surface, having a smaller radius than the first annular projection and the second annular projection, and configured to protrude toward the rotor in the axial direction entirely around the rotational axis; and'
a fourth annular projection on the inner peripheral wall at a second distance from the third annular projection in the radial direction, having a smaller radius than the first annular projection and the second annular projection, and protruding toward the housing unit in the axial direction entirely around the rotational axis,
an axial gap between a distal end of the third annular projection and the inner peripheral wall is less than or equal to an axial direction dimension of the fourth annular projection.

6. The waterproof rotor drive unit structure recited in claim 5, wherein
at least one of the third annular projection and the fourth annular projection has a water repellent surface.

7. The waterproof rotor drive unit structure recited in claim 5, wherein the fourth annular projection is an annular member that has undergone a water repellent treatment, and is fixed to the rotor.

8. The waterproof rotor drive unit structure recited in claim 5, wherein
at least one of the third annular projection and the fourth annular projection has a surface layer that is an elastic body.

9. The waterproof rotor drive unit structure recited in claim 1, further comprising
a first inner peripheral portion disposed on a driveshaft-facing surface of the housing unit, the first inner peripheral portion opposing the driveshaft in the radial direction from the rotational axis, and opposing an entirety of an outer periphery of the driveshaft with a third distance therebetween in the radial direction;
an inner peripheral intermediate portion disposed on the driveshaft-facing surface, the inner peripheral intermediate portion opposing an entirety of the outer periphery of the driveshaft with a fourth distance, which is larger than the third distance in the radial direction, and being disposed on the rotor side of the first inner peripheral portion in the axial direction; and,
a second inner peripheral portion disposed on the driveshaft-facing surface, the second inner peripheral portion opposing an entirety of the outer periphery of the driveshaft with a fifth distance, which is smaller than the fourth distance in the radial direction, and being disposed on the rotor side of the inner peripheral intermediate portion in the axial direction.

10. The waterproof rotor drive unit structure recited in claim 9, wherein
at least one of the first inner peripheral portion, the inner peripheral intermediate portion, the second inner peripheral portion, a portion that faces the first inner peripheral portion, a portion that faces the inner peripheral intermediate portion, and a portion that faces the second inner peripheral portion, has a water repellent surface.

11. The waterproof rotor drive unit structure recited in claim 1, wherein
the driveshaft includes a rotor collar comprising a fixed disc portion configured to be sandwiched between a boss portion of the rotor configured to be fitted on the driveshaft and an inner ring of a one-way clutch fitted to the driveshaft, a cylindrical portion extending from an outer periphery of the disc portion toward a rotor side in the axial direction, and a circular ring portion extending radially outwardly from the cylindrical portion around the rotational axis, and
the inner peripheral wall is formed in the circular ring portion.

12. The waterproof rotor drive unit structure recited in claim 11, wherein
the second annular projection has a larger radius than the first annular projection, and is disposed on the outer peripheral end of the circular ring portion.

13. The waterproof rotor drive unit structure according to claim 1, wherein
the housing unit comprises
a housing body accommodating the one-way clutch, and
a cover plate covering the inner peripheral wall side of the housing body,
the rotor-facing surface being on the cover plate.

14. A spinning reel, comprising: a main body;
a spool having a spool shaft cantilevered by the main body;
a rotor configured to wind a fishing line onto the spool; and
the waterproof rotor drive unit structure recited in claim 1.

15. The waterproof rotor drive unit structure according to claim 1, wherein
the axial gap between the distal end of the first annular projection and the inner peripheral wall remains constant during operation of the waterproof rotor drive unit structure.

16. The waterproof rotor drive unit structure according to claim 1, wherein
the first annular projection remains axially static during operation of the waterproof rotor drive unit structure.

* * * * *